Feb. 6, 1962    G. A. PHILBRICK    3,019,983
MULTIPLIER
Filed Feb. 4, 1955    7 Sheets-Sheet 1

INVENTOR
George A. Philbrick
BY
Curtis Morris & Safford
ATTORNEY

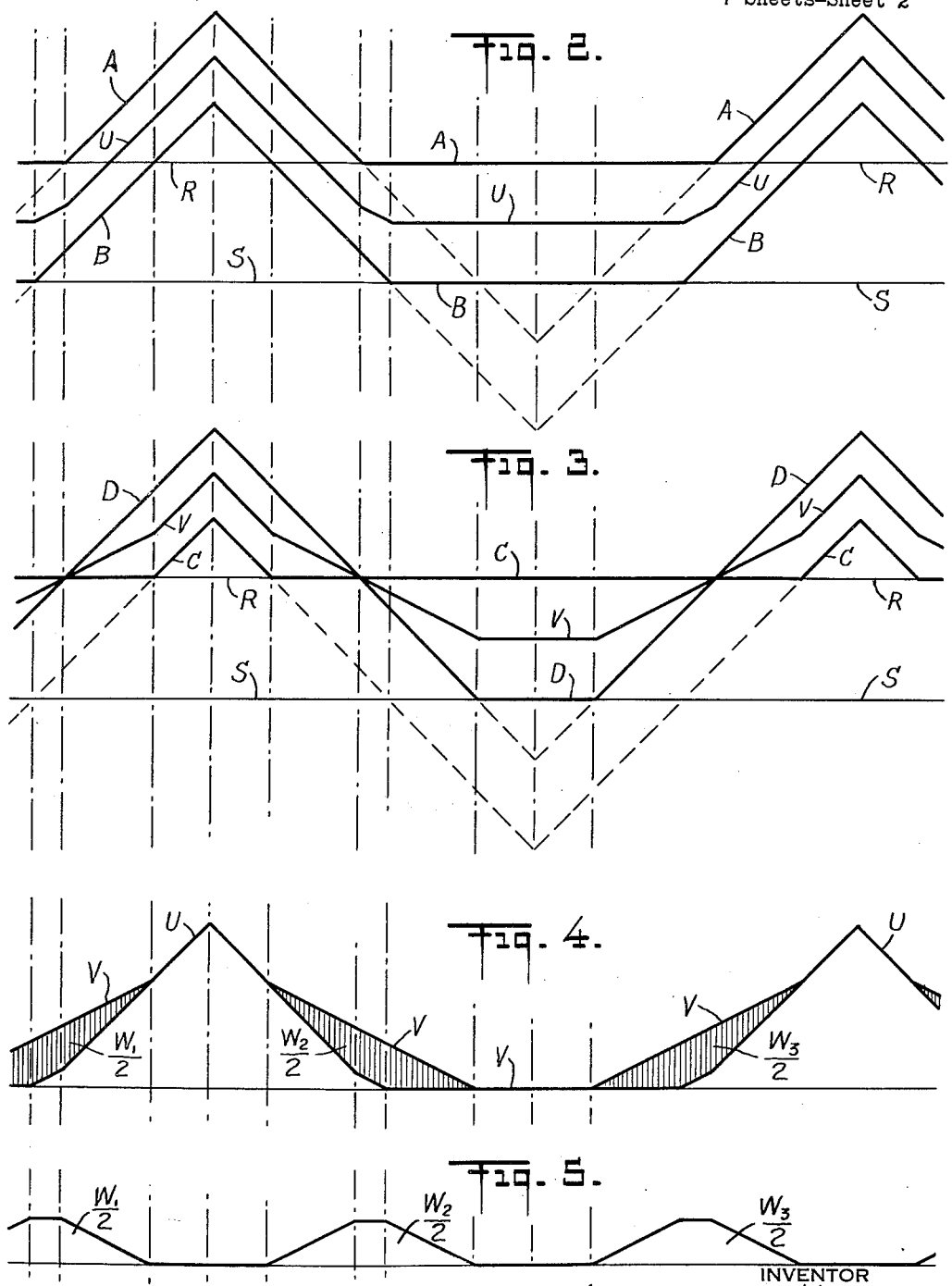

Feb. 6, 1962
G. A. PHILBRICK
3,019,983
MULTIPLIER
Filed Feb. 4, 1955
7 Sheets—Sheet 3
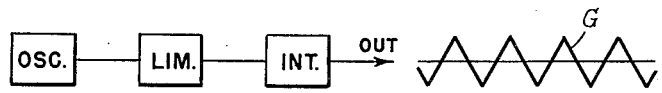
Fig. 6.
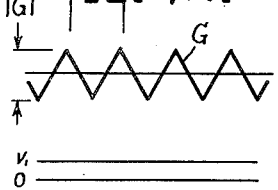
Fig. 7A.
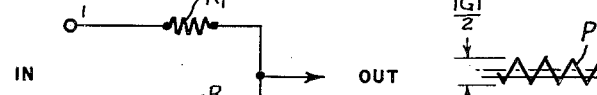
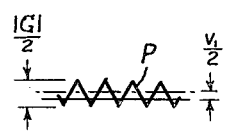
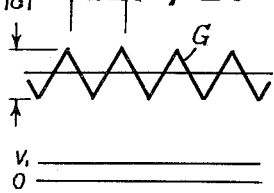
Fig. 7B.
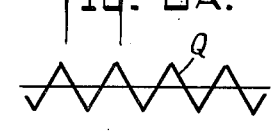
Fig. 8A.
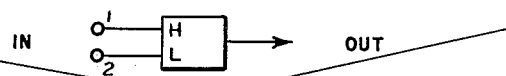
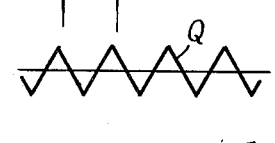
Fig. 8B.
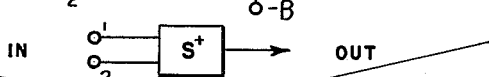
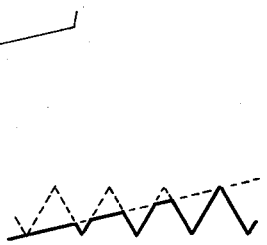
Fig. 9.
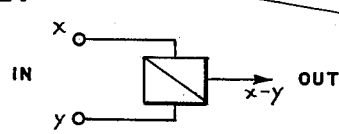
INVENTOR
George A. Philbrick
BY
Curtis, Morris + Safford
ATTORNEYS INVENTOR
George A. Philbrick
BY
Curtis Morris & Safford
ATTORNEYS

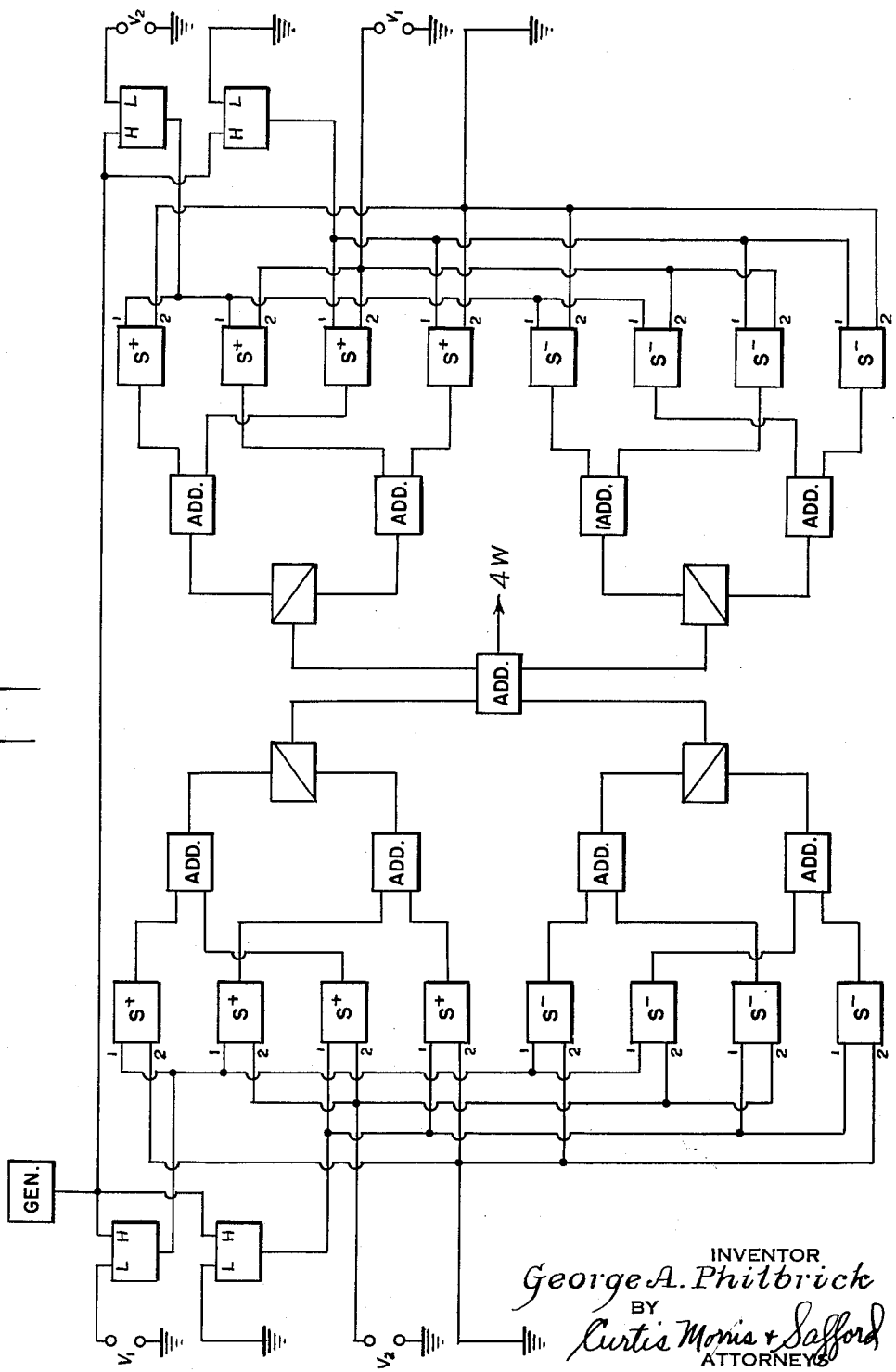

Feb. 6, 1962
G. A. PHILBRICK
3,019,983
MULTIPLIER
Filed Feb. 4, 1955
7 Sheets-Sheet 6
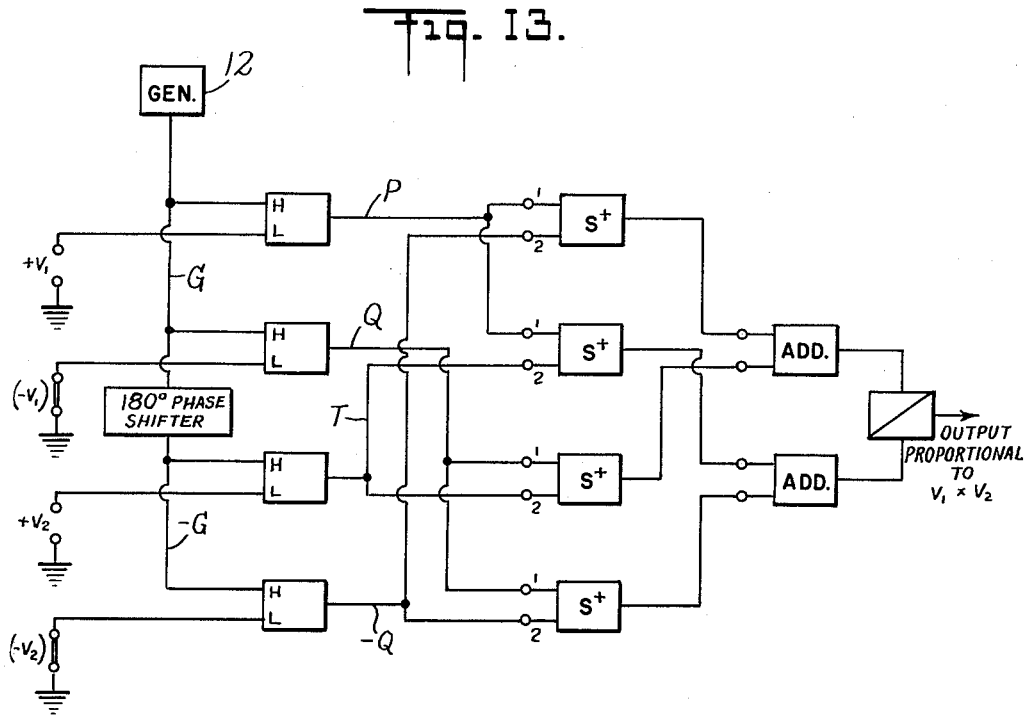
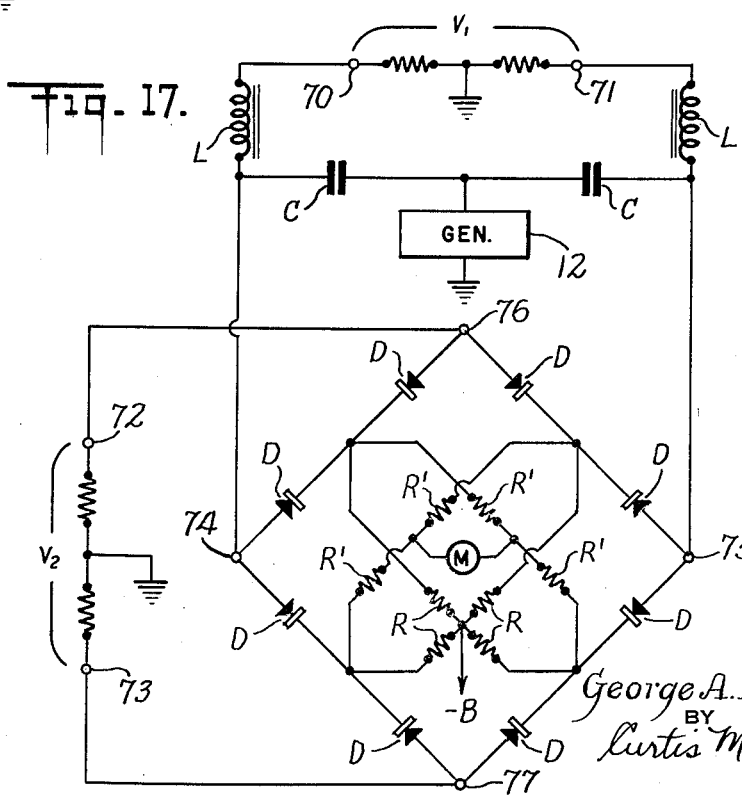
INVENTOR
George A. Philbrick
BY
Curtis, Morris & Safford
ATTORNEYS

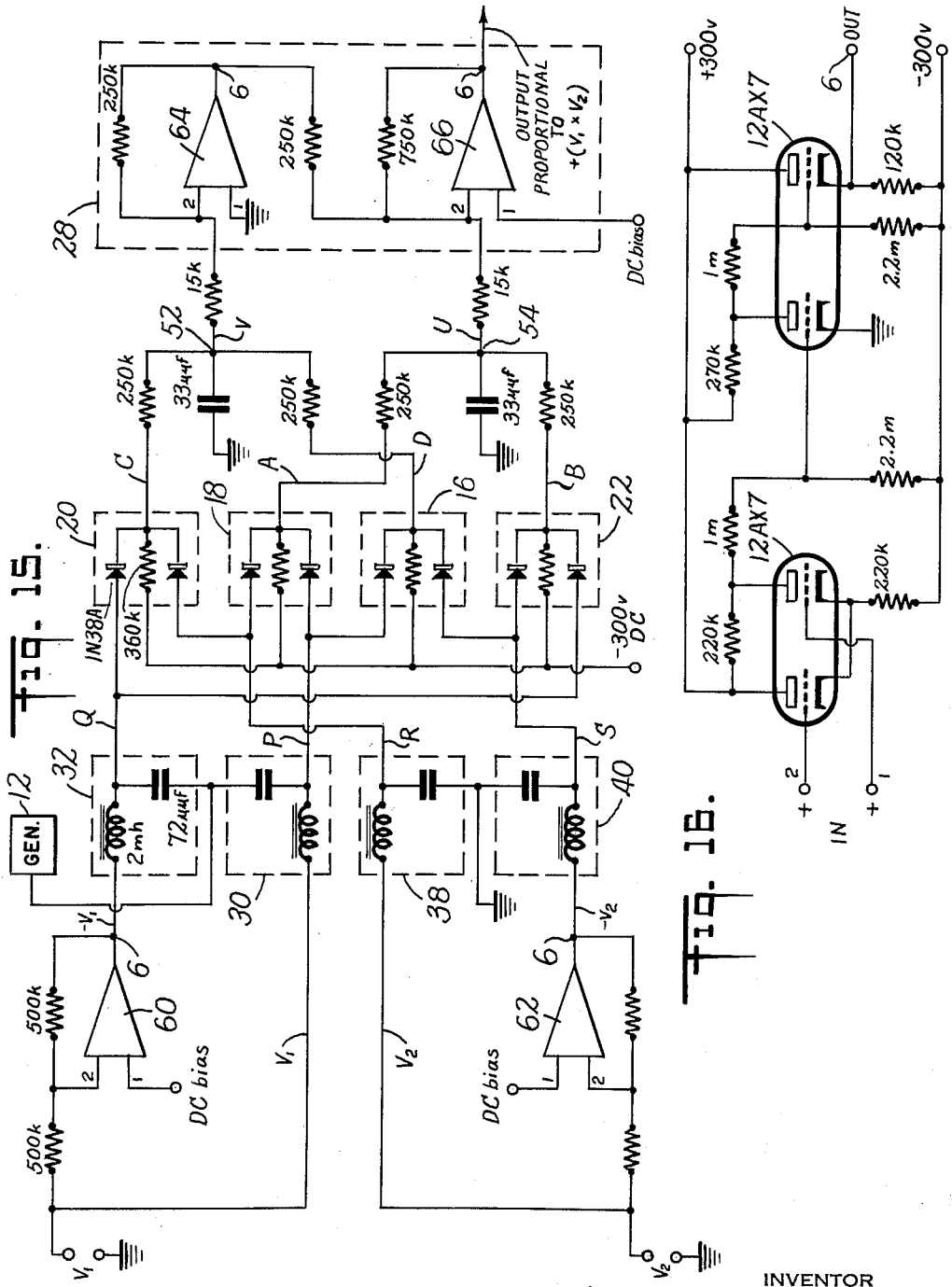

United States Patent Office 3,019,983
Patented Feb. 6, 1962

3,019,983
MULTIPLIER
George A. Philbrick, Springdale Ave., Dover, Mass.
Filed Feb. 4, 1955, Ser. No. 486,050
30 Claims. (Cl. 235—194)

This invention relates to the computation of quantities and more particularly it relates to an improved method and apparatus for multiplication.

An object of this invention is to provide an improved method of computation, such as multiplication, which can be performed at high speed and with great accuracy for use, for example, in analog computers; and to provide a relatively simple and inexpensive apparatus adapted to utilize this method.

Two general systems of computation particularly suitable for machine computers are widely used at the present time. The first of these is the digital system wherein quantities are represented by discrete numbers and operated on arithmetically to obtain answers. In this system, any desired degree of accuracy can be obtained simply by carrying out the required operations with the necessary number of digits. A disadvantage of this system, however, is the necessity of programming, that is, of representing each quantity to be operated on by a series or sequence of digits and of planning the step by step operations to be performed on these digits. This is discussed more fully in "Computing Bit by Bit," p. 1223, Proc. IRE Oct. 1953. Moreover, because of the relative difficulty of performing certain calculations, such as numerical multiplication, as compared to addition or subtraction, a machine when adapted for these calculations tends to be complex, bulky, and very expensive.

The second widely used system of computation, the analog, operates directly on quantities without first converting them into numbers and is therefore able to bypass entirely the programming step required in digital systems. An illustration of such a device is a slide rule which multiplies quantities by adding together physical lengths related to the quantities. With the development of high-speed measuring equipment, the need for high-speed computers has become increasingly urgent and because analog computers can be made to operate at high speed they are well suited for applications where speed is important. However, to utilize most fully this advantage of an analog computer, a continuous multiplying device is required, wherein two or more quantities to be multiplied can be supplied to the device in the form of measurable physical variables, and the resulting quantity, which should be proportional to the mathematical product of the supplied quantities, can be derived from the device in the form of a physical variable. The physical variables involved may be of the same or of different kinds.

It is generally recognized that, whereas the operations of adding, subtracting, multiplying by a constant, and integrating and differentiating with respect to time are now satisfactorily performed with rather simple equipment, this has not been true in the case of the multiplying together of two variables.

To be of most general usefulness, a multiplying device of this kind should be both accurate and fast, should have very high resolution, and should be without discontinuities. Further, it should accept and deliver negative quantities as easily and as accurately as positive quantities; that is to say, it should possess "four quadrant" operation. And of course it should be stable with time, not changing its proportionality of response or operating level in a disturbing degree. Finally, it should be compact, easy to adjust and economical in manufacturing costs and power consumption.

In theory, one of the simplest of the various kinds of high-speed analog multipliers is an "area type" multiplier in which the amplitude of a voltage or current square wave comprising a train of pulses at fixed repetition-rate is made proportional to one quantity to be multiplied and the duration, i.e. length, of the wave is made proportional to a second quantity to be multiplied. The magnitude of the area enclosed by this voltage or current wave is then proportional to the product of the two quantities, as is the averaged voltage or current signal derived from it. The features of this arrangement are its simplicity and the fact that answers can be obtained relatively rapidly. However, the overall accuracy is low because of the difficulty of generating a sufficiently square wave and of keeping it square, especially when operated at a high speed. In addition, it suffers from the serious disadvantage of not being able to multiply negative quantities except with very complicated additional apparatus. Various attempts to improve its accuracy have been made in the past but so far as is known these have failed to provide a good multiplier which is also fast, simple and inexpensive. For this reason, other more complex kinds of analog multipliers have been devised and are used instead.

One popular kind of "non-area type" of multiplier is that which utilizes the "quarter square difference" principle, i.e. that illustrated by the expression:

$$\frac{(a+b)^2 - (a-b)^2}{4} = ab$$

The accuracy of this system depends upon, among other things, the fidelity and similarity of the squaring circuits used, and upon the stability of the adding and subtracting circuits. More importantly, large fractional errors are involved in taking the difference between nearly equal quantities and, accordingly, the accuracy of the system falls off when one of the input quantities approaches zero. A wide gap remains, therefore, between multipliers which are fast, simple and easy to use and those which are accurate but expensive and, in the case of digital multipliers, relatively difficult to use. The present invention is intended to fill this gap.

In accordance with the present invention, a method for multiplying two or more quantities is provided which retains the basic features of area-type multiplication but which by-passes the difficulties inherent therein. In particular, the square wave variable function with its large harmonic components is replaced by a variable function which may have, relatively speaking, only small harmonic components but which none-the-less permits a high degree of accuracy. In other words, the present method decreases the need for violent and difficult discontinuities in the wave forms of the variable functions and thus makes it relatively easy to generate these variable functions. Briefly stated, this method includes the steps of generating a first variable which may be a voltage, a current, a mechanical movement, or the like having straight-line waveform segments, such as a triangular or a saw-tooth wave; producing a second variable identical to the first variable except displaced therefrom by an amount proportional to a first quantity to be multiplied so that the instantaneous difference between the first and second variables is proportional to the first quantity; similarly, providing third and fourth variables instantaneously differing from each other only by an amount proportional to a second quantity to be multiplied: and combining these variables to obtain an output which is proportional to the product of the two quantities. That these variables can be so combined to produce the product is easily demonstrated by a point by point analysis, to be given hereinafter, of their waveforms. Moreover, from this analysis it is evident that four-quadrant multiplication is possible, that is, the product of a positive quantity and a negative quantity will be negative, and the product of two negative or two positive quantities will be positive. Because the accuracy of answers obtained by this method is considerably independent of the detailed shape of the wave forms of the variables, providing that the instantaneous differences between the first and second and between the third and fourth variables are proportional, respectively, to the first and second quantities to be multiplied, then so long as the shape of the first and second variables is sufficiently straight-sided and constant, and their frequency is high relative to the frequency of the quantities to be multiplied, high accuracy is easily obtainable.

A simple and specific illustrative arrangement for carrying out the above outlined method includes a triangular wave voltage generator, means for biasing, i.e. shifting the position, of the triangular voltage an amount corresponding to a first input voltage proportional to a first quantity to be multiplied, a source of a second input voltage proportional to a second quantity to be multiplied, four pairs of diodes, each pair arranged in a special circuit, which for convenience will hereinafter be called a "selector" circuit, for selecting the maximum (or minimum) instantaneous voltage of four of the six possible pairs of the four applied voltages, these voltages being (1) the triangular wave, (2) the shifted triangular wave, (3) the second input voltage and (4) a reference voltage (which may be zero), and adding and subtracting means for combining, in properly paired sequences, the four voltage outputs of these selectors to obtain a voltage which is proportional to the product of the two quantities to be multiplied. While this brief explanation of the method and apparatus of the present invention will help in understanding its general nature, a more complete understanding of the invention will best be gained from the following description given in connection with the accompanying drawings in which:

FIGURE 1a is a diagram of waveforms of variables provided in accordance with the present invention and shown by way of example;

FIGURES 1b, 1c, and 1d are alternative waveforms of a variable in FIGURE 1a;

FIGURES 2, 3, 4 and 5 illustrate a sequence of steps in combining the variables of FIGURE 1a to obtain an output proportional to the product of two quantities to be multiplied;

FIGURES 6, 7a, 7b, 8a, 8b, and 9 show illustrative component parts of a physical embodiment of the invention;

FIGURE 12 shows a modification of the embodiment shown in FIGURE 11;

FIGURE 13 shows an illustrative block diagram of a second embodiment of the invention;

FIGURE 15 shows a detailed circuit diagram of an embodiment of the invention substantially the same as that shown in block form in FIGURE 11;

FIGURE 16 shows the detailed circuit of an element in FIGURE 15; and

FIGURE 17 shows schematically another embodiment of the invention.

Figure 1A:
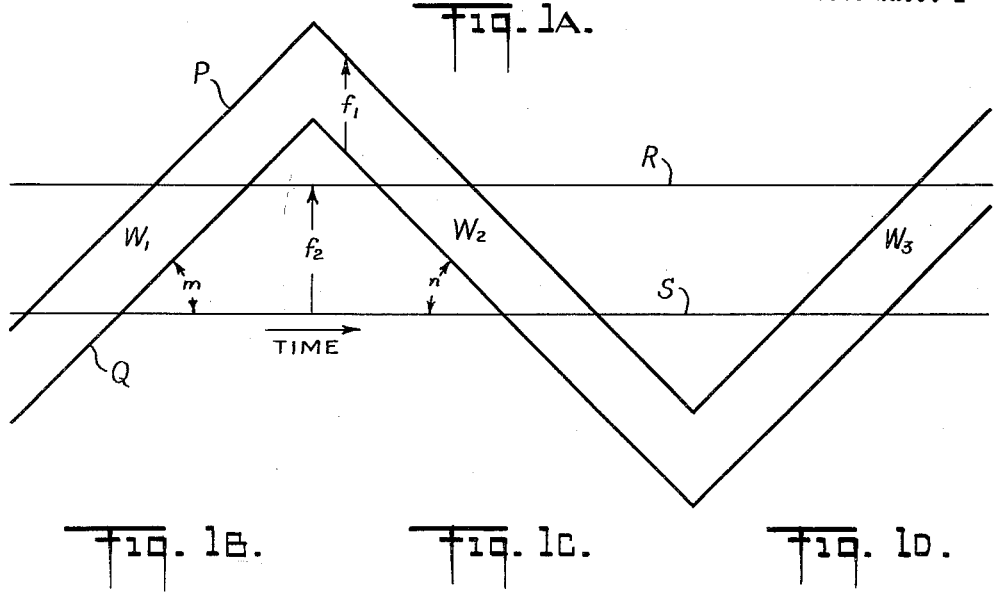

Referring now in detail to the drawings, FIGURE 1a shows illustrative waveforms plotted against time of variables which can be utilized in the above outlined method of multiplication. Approximately one cycle of a periodic triangular-wave variable Q is shown, together with a second variable P identical to Q except shifted relative thereto by an amount $f_1$ which is proportional to a first quantity to be multiplied, a third variable R displaced above a reference axis by an amount $f_2$ which is proportional to a second quantity to be multiplied, and a fourth variable S which is congruent with the axis of symmetry of variable Q (although this is not necessary) and which may be thought of as defining the reference axis. Although for the sake of simplicity, the second variable P is shown as being shifted from the first variable Q by the amount $f_1$ proportional to the first quantity to be multiplied, it should be noted that the two waves P and Q may have any absolute average values desired provided only that they differ instantaneously by the amount $f_1$. Similarly, although the third variable R is shown as a value displaced from the fourth variable S by an amount $f_2$ proportional to the second quantity to be multiplied, and although the fourth variable S is shown as the axis of symmetry of the wave of the first variable Q, it is to be understood that both variables R and S may have any absolute average values desired provided only that they differ instantaneously by the amount $f_2$ and that they both intersect both of the variables P and Q in the straight-line portions thereof. In actual operation it usually is preferable to have the average value of the variables P and Q approximately the same as that of the variables R and S.

From FIGURE 1a it is readily seen that areas $W_1$, $W_2$ and $W_3$, bounded by segments of the waveforms of these four variables, are proportional to the product $(f_1, f_2)$. In the particular diagram shown, areas $W_1$, $W_2$, and $W_3$ are each geometrically congruent because waves P and Q intersect R and S at every point at equal angles. In a more general case where Q intersects S at one angle when going positive and at a different angle when going negative, that is, when angles $m$ and $n$ are not equal in magnitude, areas $W_1$ ad $W_3$ will be equal to each other but not to $W_2$, although all three will be proportional to $(f_1, f_2)$. Best accuracy is obtained when displacements $f_1$ and $f_2$ are made as large as the amplitude of variable Q permits, that is, when areas $W_1$, etc. are made as large as possible within the limits of linearity of the straight-sided portions of the waveforms. In addition, angles $m$ and $n$ are advantageously approximately equal. It should be appreciated, however, that even when displacements $f_1$ and $f_2$ are small relative to the amplitude of Q and even though the waveform of Q is unsymmetrical, very good accuracy is obtainable.

A virtue of this method is that a physical variable function having a waveform like or similar to variable Q is relatively much easier to produce than a square-wave function since there are no sudden rises or jumps in such a variable as there are in a square wave. Thus, for example, in an electronic multiplier using a voltage or current triangular-like wave, the overall frequency bandwidth required to generate and accommodate the various waves including one entirely satisfactory as variable Q is much less than the frequency bandwidth necessary in a square-wave multiplier of comparable accuracy. This is particularly advantageous when, because functions $f_1$ and $f_2$ are varying at a relatively rapid date, variable Q must be made to vary at an even higher rate.

The factors which affect the accuracy of the product $(f_1, f_2)$ measured by areas $W_1$, etc. in FIGURE 1a include the linearity of the bounds of these areas and the constancy of each of angles $m$ and $n$. The leading and trailing segments of variables P and Q are advantageously straight and of constant slope throughout their operating length, i.e. the portions of their length bounding areas $W_1$, $W_2$, $W_3$, though somewhat less than this is acceptable. If the quantity to be multiplied, as represented by $f_1$ or $f_2$, is varying at too rapid a rate relative to the cyclic variation of Q, or if the portions of P and Q which bound these areas are not straight and of constant slope, these areas will not be proportional to the product $(f_1, f_2)$ for all conditions. However, these requirements for accuracy are easily met in numerous physical embodiments, but particularly in high speed electronic apparatus, since ways to generate discrete voltages of identical triangular waveshape, or the like, equivalent to variables P and Q and having good symmetry and sufficient linearity at almost any desired frequency, are well known to the art.

Figures 1B, 1C, 1D:
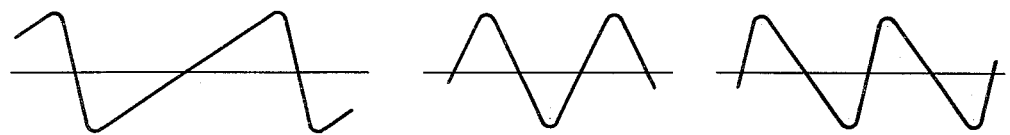

It is not to be implied from the foregoing that variable Q in FIGURE 1a must be exactly or even substantially as shown to obtain accurate measurements. For this reason, several of the many alternative waveforms which are usable, though somewhat less acceptable, are illustrated in FIGURES 1b through 1d. Also, these waveforms are shown rounded at their peaks as they would be if generated in an electric circuit of limited bandwidth because such waveforms also are usable. For best accuracy, however, it is desirable that the waveform of each be as straight-sided as possible, at least in the active regions.

A specific illustrative way of combining the variables P, Q, R and S in FIGURE 1a to obtain an output proportional to the product $(f_1, f_2)$ is shown graphically in FIGURES 2, 3, 4 and 5. The solid lines A and B in FIGURE 2 represent the "upper selections" of the pair of variables P and R and the pair of variables Q and S, respectively. That is, A corresponds to P as long as P is more positive than R, and corresponds to R when R is more positive than P. In a similar way B is the "upper selection" of Q and S. Line U, lying between A and B, is the average of the instantaneous values represented by A and B. Lines C and D in FIGURE 3 are the "upper selections" of P and S and Q and R, respectively, and line V is the average of the instantaneous values of these selections. Thus the "upper selections" of the selected pairs of the variables P, Q, R, and S are determined. The difference in the average instantaneous values of these pairs of "upper selections" may be plotted as a combined response whose enclosed areas are proportional to the areas $W_1$, $W_2$, etc. For convenience, U and V are plotted as super-imposed upon each other in FIGURE 4 so that this difference between them can easily be seen. This difference, indicated by the shaded areas in FIGURE 4, is plotted as a series of pulses in FIGURE 5. From this it is evident that the area of each of these pulses is proportional to the product $(f_1, f_2)$. A response whose amplitude at any time is proportional to the areas of these pulses can be obtained simply by passing them through an appropriate low-pass filter.

If variables R and S were reversed in FIGURE 1a, which is equivalent to making $f_2$ negative instead of positive, then selections A and B in FIGURE 2 would be like selections C and D in FIGURE 3, and C and D would be like A and B. The difference between average V and average U would then be negative, as would the pulses shown in FIGURE 5. By extending this analysis, it can be shown that the product of two positive, or of two negative, quantities gives a positive result, and the product of a positive and a negative quantity, a negative result.

An output identical to that shown in FIGURE 5 (though reversed in sense) can be obtained by selecting, instead of the upper values A, B, C and D shown in FIGURES 2 and 3, the lower values of the selected pairs P—R, Q—S, P—S, and Q—R, i.e. "lower selections."

The structures of specific illustrative embodiments of the present invention will most easily be understood by considering separately each component part of each structure and then each structure as a whole. First of the component parts to be considered is an electric wave generator shown in block symbol form in FIGURE 6. A circuit for this generator includes a fixed frequency oscillator, OSC, a limiter, LIM, and an integrator, INT, indicated schematically in the drawing and connected in series as shown to give an output voltage of constant frequency having a triangular waveform G corresponding to variable Q in FIGURE 1a. The circuit details for such a generator are well known to the art. FIGURE 7a shows a circuit for shifting an input voltage G relative to its normal position by an amount proportional to a biasing voltage $v_1$ to give an output corresponding to variable P in FIGURE 1a, i.e. for adding G and $v_1$. While any true "adder" circuit may be used for this purpose, the simple shifting circuit shown in FIGURE 7a (with its block symbol) is quite useful for this purpose. This circuit might be called an "averaging adder" since, when $R_1$ is equal to $R_2$, its output P is equal to one-half of the sum of its inputs G and $v_1$. A shifting circuit or "adder" better suited for high frequencies is shown in FIGURE 7b (with its block symbol) and consists of a low-pass high-pass filter with input terminals H and L to which are applied voltages G and $v_1$, respectively, and whose output equals $v_1$ plus G. FIGURE 8a shows an "upper-selector" circuit (and its block symbol) in which the more positive of the voltages of the two waves Q and E at each instant of time is selected to give an output approximately as shown. The circuit consists of two diodes whose cathodes are connected together and biased in current by means of a suitable resistor and negative direct potential —B and whose anodes are connected through the input terminals to voltages Q and E. This negative current bias is provided so that the selector action of the circuit will be continuous (under typical loads) even though both voltages Q and E are negative at the same time. Each of these diodes is assumed to conduct only when its anode is more positive than its cathode and with this assumption in mind the action of the circuit is self-evident. A "lower-selector" circuit, which can be used instead of the "upper-selector" as explained in connection with FIGURE 5, is shown in FIGURE 8b and is entirely analogous in operation to that of the "upper-selector" circuit of FIGURE 8a. FIGURE 9 shows a block symbol of a "subtractor," for subtracting two voltages X and Y as indicated. Suitable circuits for this element are well known.

Figure 10:
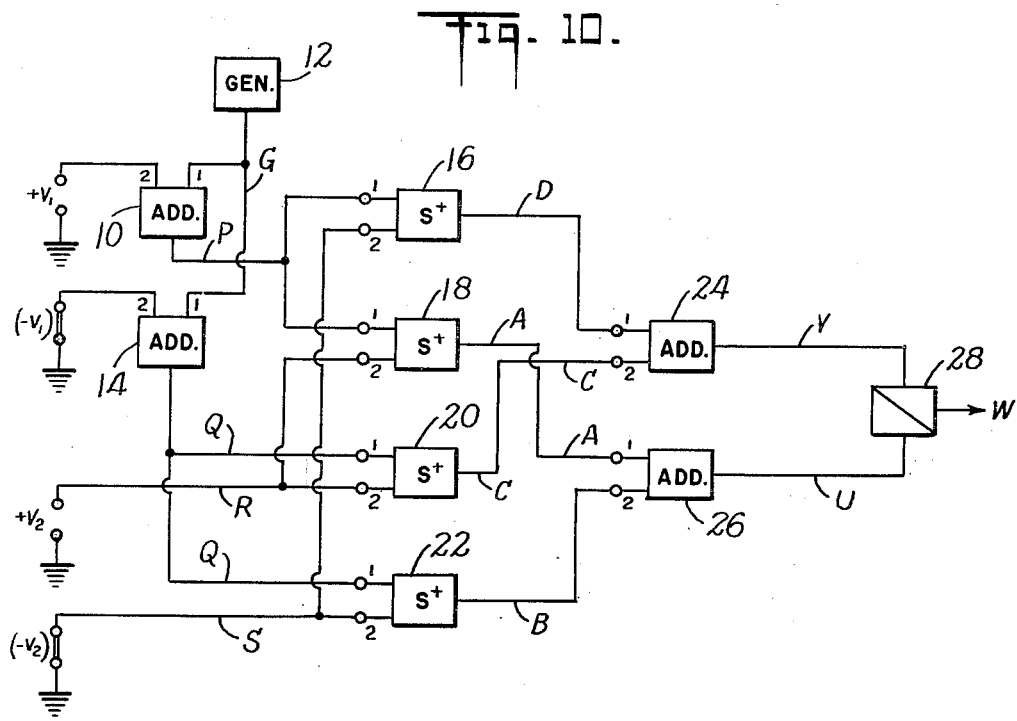
FIGURE 10 shows an illustrative block diagram of a physical embodiment of the invention.

A specific embodiment of the invention in block form assembled from component parts which have just been described is shown in FIGURE 10. A voltage $v_1$, corresponding to the first quantity to be multiplied as represented by $f_1$ in FIGURE 1a, is applied to input terminal 2 of adder 10. The voltage G obtained from triangular-wave generator 12 is applied to input terminal 1 of this adder and of adder 14. Terminal 2 of adder 14 is grounded. The output from adder 10 is a voltage corresponding to variable P in FIGURE 1a, and is fed to each of terminals 1 of upper selectors 16 and 18. A voltage $v_2$, corresponding to the second quantity to be multiplied as represented by $f_2$ in FIGURE 1a, is applied to each of input terminals 2 of "upper selectors" 18 and 20. This voltage $v_2$ corresponds to variable R in FIGURE 1a. The output from adder 14 is a voltage corresponding to variable Q and is applied to each of terminals 1 of "upper selectors" 20 and 22. Ground potential, corresponding to variable S in FIGURE 1a, is applied to each of terminals 2 of selectors 16 and 22. The outputs from selectors 16 and 20, corresponding respectively to variables D and C in FIGURE 3, are fed to the input terminals of adder 24 and the outputs from selectors 18 and 22, corresponding respectively to variables A and B in FIGURE 2, are fed to the terminals of adder 26. The output from adders 24 and 26, corresponding respectively to variables V and U in FIGURES 2 and 3, are fed to the input of subtractor 28 whose output, corresponding to variable W in FIGURE 5, is proportional to the product $(v_1, v_2)$. The action of this circuit corresponds step by step with the method described in connection with FIGURES 1 through 5. The respective waveforms at each point in the circuit have been identified accordingly.

Of course, instead of using the simple but asymmetrical input arrangement just described, a "negative" voltage related to $v_1$ may be applied to input terminal 2 of adder 14 providing only that the difference between the instantaneous voltages applied to input terminals 2 of adders 10 and 14 be proportional to the first of the quantities to be multiplied. Similarly, a "negative" voltage related to $v_2$ may be applied to input terminals 2 of selectors 16 and 22 as long as the difference between the voltage applied to these terminals and that applied to input terminals 2 of selectors 18 and 20 be proportional to the second of the quantities to be multiplied. An important effect of so connecting these additional and reversed functions is to quadruple the sensitivity of the circuit. Aside from a change in the relative positions of the waveforms shown in FIGURE 1a, for given total displacements between P and Q, and between R and S, the operation of the circuit of FIGURE 10 as modified would be the same as its operation when $(-v_1)$ and $(-v_2)$ are omitted and the respective terminals left grounded.

Figure 11:
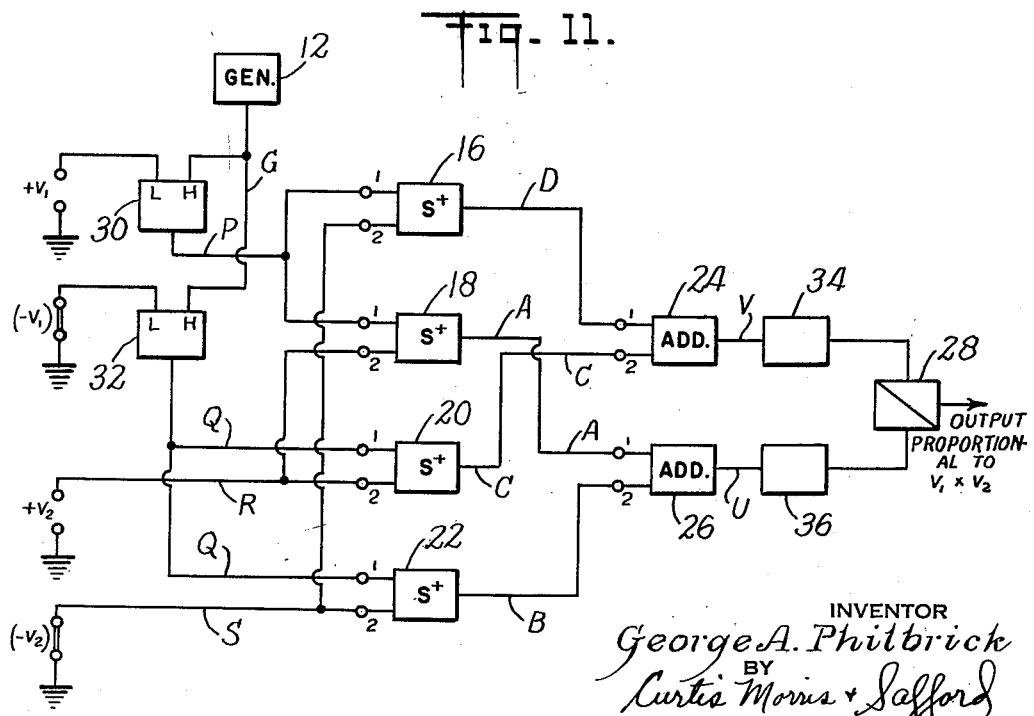
FIGURE 11 shows a modification of the embodiment of FIGURE 10.

A circuit more suitable for high speeds than that shown in FIGURE 10 (which uses the shifting circuit of FIGURE 7a) is given in FIGURE 11. This circuit differs from the former principally by the substitution for adders 10 and 14 of high-pass low-pass filters 30 and 32, respectively, such as those shown in FIGURE 7b, connected as shown. Elements and waveforms here which are the same as those in FIGURE 10 have been identified by their respective reference numbers. In addition to these elements two low-pass filters 34 and 36, of any suitable type well known to the art, or like those shown in FIGURE 15, have been inserted between adders 24 and 26 and subtractor 28 so that the output of the subtractor will be the appropriate time-average of the pulse-waveform shown in FIGURE 5 rather than the pulses themselves. If desired, equivalent filtering can be obtained in any other convenient way, for example, by using a single low-pass filter connected to the output of subtractor 28. Such filtering could, of course, be provided in the circuit of FIGURE 10.

In FIGURE 11 (as suggested above in connection with FIGURE 10) if desired, a function $-v_1$, a negative image relative to $v_1$ (not necessarily negative with respect to ground since $v_1$ itself may be such), can be connected between terminal L of this shifter 30 and ground as indicated. Similarly, a function $-v_2$, a negative image relative to $v_2$ can be connected between terminal 2 of selector 22 and ground as indicated. As mentioned in connection with the arrangement of FIGURE 10, this quadruples the sensitivity of the device.

If desired, the four "upper selectors" shown in FIGURES 10 and 11 may be replaced by four of the "lower selectors" shown in FIGURE 8b without materially changing the operation of the other elements of the circuit, although it would reverse the sign of the product, which reversal, however, is easily corrected, if desired. Since this is true, it is apparent that in the circuit of FIGURES 10 and 11, four "upper selectors" and their associated "adders" and "subtractor" can be connected in parallel with four "lower selectors" and their associated "adders" and "subtractor" to obtain an output twice W in magnitude. Moreover, by providing an additional parallel arrangement of this sort in which $v_1$ and $v_2$ are interchanged from their positions shown in FIGURES 10 and 11, a second doubling of the output can be obtained. Thus, by connecting eight "upper selectors" and eight "lower selectors" in parallel in the proper manner with their associated elements, an output four times the magnitude of W, for given inputs $v_1$ and $v_2$, can be obtained. This arrangement is shown in FIGURE 12.

Figure 14:
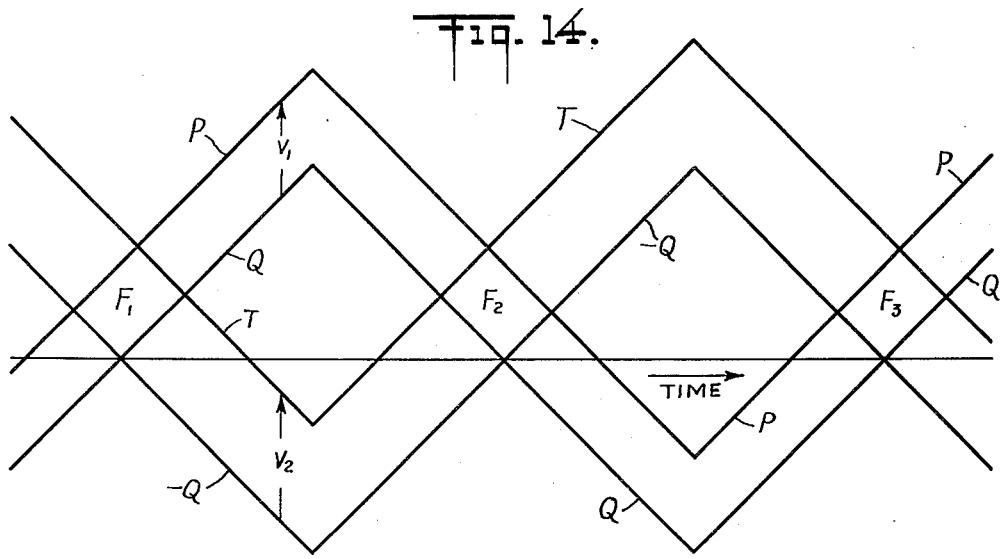
FIGURE 14 illustrates waveforms appearing at points in the embodiment of FIGURE 13.

A more symmetrical embodiment of the present invention than that shown in FIGURES 10 or 11 is shown in FIGURE 13. Here voltage $v_2$, as well as $v_1$, is utilized to shift a triangular-wave voltage relative to its normal position. The voltage shifted by $v_2$ is, for convenience, the reverse of variable Q and can be obtained from the triangular-wave generator 12 through the use of a balanced-output generator or through a 180° phase-shifter 13 as shown. The operation of this circuit is otherwise substantially the same as that of the circuit in FIGURE 11. The waveforms P, Q, $-Q$, and T appearing at the points so identified in FIGURE 13 are illustrated in FIGURE 14. For the sake of comparison, displacements $v_1$ and $v_2$ are made equal in magnitude respectively to $f_1$ and $f_2$ of FIGURE 1a, and areas $F_1$, $F_2$, and $F_3$ correspond to areas $W_1$, $W_2$, $W_3$ in FIGURE 1a.

A detailed circuit diagram of a specific embodiment of the invention which has been built and tested is shown in FIGURE 15. The frequency of triangular-wave generator 12 was set at 2 mc. and the frequencies of $v_1$ and $v_2$ were as high as 50 kc. This circuit, except for minor variations, is the same as that shown in block form in FIGURE 11 when $-v_1$ and $-v_2$ are applied to the input in addition to $v_1$ and $v_2$. Circuit elements, voltages and waveforms at each place or point in the circuit of FIGURE 15 are identified by the same reference characters as those used in FIGURE 11. In addition to high-pass low-pass filters 30 and 32, two more such filters, filters 38 and 40, have been included in the circuit here in order better to isolate high and low frequencies. The four "upper selectors" 16, 18, 20 and 22, represented in FIGURE 11, include eight IN38A crystal diodes connected as shown in FIGURE 15 and identified by their respective reference characters. Averaging filter 34 in FIGURE 11 corresponds to the 33 $\mu\mu f$. capacitor connected to junction point 52 and looking into finite impedances to the left and right in FIGURE 15. Similarly, filter 36 in FIGURE 11 corresponds to the second 33 $\mu\mu f$. capacitor and associated resistors connected to junction 54. Adders 24 and 26 and subtractor 28 in FIGURE 11 correspond in part to the 250K ohm resistances and the operational amplifiers 64 and 66 associated therewith. The symbols of the various elements of the circuit of FIGURE 15 which will not be described are known to those skilled in the art.

The circuit details of each of the operational amplifiers 60, 62, 64 and 66 shown in FIGURE 15 are given in FIGURE 16. Each of these amplifiers consists of four triodes, for example two 12AX7 twin triodes, connected as shown. A positive voltage applied to input terminal 1 of this amplifier produces an amplified positive voltage at terminal 6 while a positive voltage applied to terminal 2 produces an equally amplified negative voltage at terminal 6. By returning a portion of the output voltage to an input terminal the overall gain of such amplifier can be made equal to unity or any desired factor within a large range. Amplifiers 60 and 62 in FIGURE 15 are each connected as unity-gain phase-inverters, whereas amplifiers 64 and 66 are connected together to form a subtractor corresponding to subtractor 28.

FIGURE 17 shows a form of the invention which demonstrates more clearly its inherent symmetry and simplicity. The input voltages $v_1$ and $v_2$ corresponding to the two quantities to be multiplied are applied across loads with respect to ground between terminals 70—71 and 72—73, respectively. Each of the portions of voltage $v_1$ is applied through an inductor L corresponding to the inductor L in the shifter shown in FIGURE 7b, to one of the two corners 74 and 75 of a ring of eight diodes D. Similarly, each of the portions of voltage $v_2$ is applied to its respective corner 76 and 77 of this ring of diodes D. A generator 12, such as shown in FIGURE 6, is connected through the two capacitors C, corresponding to capacitor C in the shifter of FIGURE 7b, to the two corners 74 and 75 of the diode ring. Thus the input connections for this circuit are symmetrical. Each of the pairs of diodes D is connected cathode to cathode between terminals 74—76, 74—77, 75—77, and 75—76 and they, together with their respective current biasing resistors P which are connected to a common negative D.C. bias source, comprise the four upper selectors whose operation was explained in connection with FIGURE 8a. The output from these selectors is combined by means of two pairs of resistors R' to obtain a resultant related to the product of $v_1$ and $v_2$. This resultant may be indicated by any suitable responsive device, such as a meter M connected as shown. The reading of such a meter will be proportional to the product desired ($v_1$, $v_2$) since meter M and resistors R' serve instead of, for example, adders 24 and 26 and subtractor 28 shown in FIGURE 10.

The foregoing description of the method and apparatus of the present invention is intended in illustration and not in limitation. In particular, the description of various modifications of the invention is not meant to imply that additional modifications or changes, which may occur to those skilled in the art, cannot be made without departing from the spirit or scope of the invention as set forth.

I claim:

1. The method of multiplying a first quantity by a second quantity including the steps of: forming an area proportional to the product of said first and second quantities by providing a segment of a first triangular or saw tooth like wave, providing a segment of a second triangular or saw tooth like wave substantially the same as the segment of said first wave but shifted relative thereto by an amount proportional to said first quantity to be multiplied, providing a segment of a third wave displaced from a reference axis by an amount proportional to said second quantity to be multiplied, and measuring an area bounded by said three segments and said reference axis to determine the product of said first and second quantities.

2. A computer including means for providing a first triangular, or saw-tooth-like wave, means for providing a second wave substantially like said first wave but shifted in amplitude relative thereto by an amount proportional to a first quantity to be multiplied, means for providing a third wave of shape similar to said first wave but shifted in phase with respect thereto, means for providing a fourth wave substantially like said third wave but shifted relative thereto by an amount proportional to a second quantity to be multiplied, and means for combining said four waves to obtain an output related to the product of said quantities.

3. A method of multiplying including the steps of, representing as an area in time-displacement coordinates the product of two quantities to be multiplied, the sides of said area being inclined at an angle substantially different from 90° relative to a zero magnitude axis in said coordinates, and measuring said area to determine the product of said quantities.

4. An area-type multiplier including a voltage generator for providing a high-frequency voltage, means to provide a second voltage shifted relative to said high frequency voltage an amount proportional to a first low frequency quantity to be multiplied, means for providing a third and a fourth voltage whose difference is proportional to a second low frequency quantity to be multiplied and whose waveforms lie at an angle to said high-frequency voltage, means for selectively rectifying in individual pairs four separate pairs of said high frequency voltage, said second voltage, said third voltage, and said fourth voltage to obtain four intermediate voltages, and means for combining said intermediate voltages to obtain an output voltage related to the product of said first and second quantities.

5. The combination of elements as in claim 4 in which segments of said four voltages bound an area proportional to the product of said first and second quantities, at least one side of said area being inclined to said axis by an angle substantially different from zero and 90°.

6. An area type multiplier comprising means for generating a first electric signal whose instantaneous value varies at a linear finite rate so that the waveform of said signal includes a straight line portion inclined at an angle substantially different from 90° relative to a zero signal amplitude axis, means for providing a second electric signal displaced relative to said first signal by an amount proportional to a first quantity to be multiplied, means for providing a third electric signal whose waveform is displaced from a reference signal axis an amount proportional to a second quantity to be multiplied and whose waveform is not parallel to said first signal, and means for selectively rectifying and combining said three signals and said reference signal to obtain an output electric signal related to the product of said first and second quantities.

7. In combination, a circuit of eight current-rectifying diodes connected anode to anode and cathode to cathode in a ring, the junctions of the anodes establishing a first set of four terminals, the junctions of the cathodes establishing a second set of terminals, one of said sets of four terminals being adapted to receive input signals, means for biasing said diodes so that one or the other diode at each like junction is always conducting, and means connected to said other set of four terminals for combining the signals appearing at these terminals to obtain the product of said input signals when segments of said signals define a quadrilateral area in time-amplitude coordinates.

8. An analog multiplier comprising a triangular wave voltage generator, first combining means having a high frequency input terminal, a low frequency input terminal and an output terminal, second combining means having a high frequency input terminal, a low frequency input terminal and an output terminal, means for connecting said generator to both of said high frequency input terminals, means for applying a voltage proportional to a first quantity to be multiplied to one of said low frequency terminals and the negative of said voltage to the other of said low frequency terminals, a circuit of eight current rectifying diodes connected anode to anode and cathode to cathode in a ring the junctions of the anodes establishing a first set of four terminals, the junctions of the cathodes establishing a second set of four terminals, means for biasing said diodes so that one or the other diode of each pair is always conducting, means for connecting one of said combining means' output terminals to a first terminal of one set of said sets of four terminals, means for connecting the other of said combining means' output terminals to a second diagonally opposite terminal of said one set, means for applying a voltage proportional to a second quantity to be multiplied to a third terminal of said one set and the negative of said voltage to a fourth terminal of said one set, means for adding the voltages appearing at two terminals of the other of said sets of four terminals to obtain a first sum voltage, means for adding the voltages appearing at two other terminals of said other set to obtain a second sum voltage, and means for subtracting said first and second sum voltages to obtain an output related to the product of said first and second quantities.

9. In an electronic analog computer, the method of measuring an area bounded by respective straight-sided segments of at least three electrical impulses which method includes the steps of combining said impulses into a plurality of distinct pairs, selecting from each of said pairs at each instant the impulse of lesser magnitude, and combining the selections obtained to obtain an output impulse related to said area.

10. In an electronic analog computer, the method of measuring an area bounded by respective straight-sided segments of at least three electrical impulses which method includes the steps of combining said impulses into a plurality of distinct pairs, selecting from each of said pairs at each instant the impulse of greater magnitude, and combining the selections obtained to obtain an output impulse related to said area.

11. The method as in claim 10 in which said area is four sided and bounded by straight-sided segments of three voltages and a reference voltage and in which said four voltages are combined into four distinct pairs from which are obtained four selected voltages which in turn are added together to obtain two sum voltages which are then subtracted from each other to obtain said output impulse.

12. In an electronic analog computer, the method of multiplying two quantities together comprising the steps of forming a non-rectangular area bounded by at least three straight-sided segments of respective currents or voltages, and combining said currents or voltages in pairs to obtain an impulse voltage whose average value is related to the product of said two quantities.

13. In an electronic analog computer the method of multiplying two quantities together comprising the step of generating at least three straight-line segments of respective electric signals co-existing in time relative to each other and if superimposed on each other and a reference signal bounding a quadrilateral at least one of whose sides is inclined at an angle substantially different from zero or 90° relative to a zero signal axis, and the step of pairing into four distinct pairs those electric signals whose segments intersect and then selecting at each instant either the greater or lesser magnitude signal in each pair to obtain four selected signals.

14. The method steps as in claim 13 in further combination with the steps of adding and subtracting in proper sequences said four selected signals to obtain an output signal related to the product of the two quantities to be multiplied.

15. A ring of eight diodes connected anode to anode and cathode to cathode in series, the junctions of the cathodes establishing a first set of four terminals the junctions of the anodes establishing a second set of four terminals, one set of terminals being input terminals, means including four resistors adapted for current biasing the two diodes at each of one of said sets of terminals so that one or the other of said diodes will be conducting, and means connected to one of said sets of four terminals for obtaining an output signal therefrom.

16. In a multiplier of the character described means for producing a first pair of high frequency triangular-like waves generally parallel to each other and displaced by an amount proportional to a first low frequency quantity to be multiplied, means for producing a second set of waves displaced from each other by an amount proportional to a second low frequency quantity to be multiplied and generally parallel to each other but not parallel to said first pair, and means for combining said four waves to produce an output proportional to the product of said quantities, said means including four selectors for selecting the greater of the two values at any instant of the two waves in each of four distinct pairs of non-parallel ones of said four waves, and means for measuring the output of said selectors to obtain an indication of said product.

17. The combination of elements as in claim 16 wherein said waves are electric signals and said selectors include eight diodes arranged two to a side of a four cornered matrix, each two diodes to a side having their like electrodes connected together, said first and second pairs of waves being applied to respective diagonal corners of said matrix, the outputs of said selectors being obtained from the four junctions of their common electrodes.

18. The combination of elements as in claim 17 wherein said first and second pairs of waves are balanced to ground and said diodes are biased so that one or the other of each two to a side is always conducting.

19. In a multiplier of the character described means for producing a first pair of high frequency triangular-like waves generally parallel to each other and displaced by an amount proportional to a first low frequency quantity to be multiplied, means for producing a second pair of waves displaced from each other by an amount proportional to a second low frequency quantity to be multiplied and generally parallel to each other but not parallel to said first pair, and means for combining said four waves to produce an output proportional to the product of said quantities, said means including four selectors for selecting the lesser of the two values at any instant of the two waves in each of four distinct pairs of non-parallel ones of said four waves, and means for measuring the output of said selectors to obtain an indication of said product.

20. The combination of elements as in claim 19 wherein said waves are electric signals and said selectors include eight diodes arranged two to a side of a four cornered matrix, each two diodes to a side having their like electrodes connected together, said first and second pairs of waves being applied to respective diagonal corners of said matrix, the outputs of said selectors being obtained from the four junctions of their common electrodes.

21. The combination of elements as in claim 20 wherein said first and second pairs of waves are balanced to ground and said diodes are biased so that one or the other of each two to a side is always conducting.

22. A high-speed area-type multiplier comprising means for generating a reference saw-tooth or serrated or triangular electric wave, means for shifting said reference wave in amplitude to obtain a first wave and a second wave which are parallel to it but differ from each other by an amount proportional to a first quantity to be multiplied, means for generating a third wave and a fourth wave which are parallel to each other and which intersect said first and second waves at an angle between 0° and 90°, said third and fourth waves differing in amplitude from each other by an amount proportional to a second quantity to be multiplied, means for combining in individual pairs a plurality of different pairs of non-parallel ones of said first, second, third, and fourth waves and for selectively rectifying said individual pairs to obtain four intermediate waves, and means for measuring said intermediate waves to obtain an output wave proportional to the product of said first and second quantities.

23. Apparatus as in claim 22 wherein said means for combining includes a ring of eight diodes connected anode to anode and cathode to cathode, the anode junctions forming a first set of four terminals, the cathode junctions forming a second set of four terminals, said means also includes at least one high-pass low-pass filter having a high frequency input and a low frequency input and a composite output, the output of said filter being connected directly to one terminal of one of said sets of terminals, said reference wave being a high frequency voltage and being connected to the high frequency input of said filter, and a low frequency voltage proportional to said first quantity being connected to said low frequency terminal of said filter, the voltages at the other of said sets of terminals being combined to obtain a voltage proportional to the product of said quantities.

24. A high-speed area-type analog device wherein the product of two quantities is obtained, said device comprising means for generating a relatively high frequency serrated or triangular wave voltage, means for generating a second voltage shifted in amplitude relative to the first by an amount proportional to a first relatively slowly varying quantity means establishing a third voltage, means for generating a fourth voltage which intersects said first voltage at intervals and which is shifted relative to said third voltage by an amount proportional to a second relatively slowly varying quantity, and means for measuring the discrete areas bounded by said four voltages to obtain a product of said quantities, said means comprising a plurality of voltage selectors, each of which includes a pair of diodes biased so that one or the other diode but not both in the pair always conducts, each selector being fed with a respective pair of non-parallel ones of said voltages and giving an output voltage which is a selection of first one then the other of said respective pair of voltages.

25. In a computer in which three variables are provided whose waveforms are displaced in amplitude relative to each other and a fourth variable by amounts determined by two quantities to be multiplied, means for combining the four variables in pairs to obtain an output proportional to the product of the two quantities, each of the variables in a pair being non-parallel to each other, said means including upper selectors for selecting the greater at any instant of the two variables in each of four distinct pairs of said four variables, and means for combining the output responses of said selectors to obtain a response related to the product of said two quantities.

26. The combination of elements as in claim 25 wherein each of said selectors includes a pair of diodes connected cathode to cathode.

27. The combination of elements as in claim 25 in further combination with lower selectors for selecting the lesser at any instant of the two variables in each of four distinct pairs of said four variables.

28. In a computer in which three variables are provided whose waveforms are displaced in amplitude relative to each other and a fourth variable by amounts determined by two quantities to be multiplied, means combining the four variables in pairs to obtain an output proportional to the product of the two quantities, each of the variables in a pair being non-parallel to each other, said means including lower selectors for selecting the lesser at any instant of the two variables in each of four distinct pairs of said four variables, and means for combining the output responses of said selectors to obtain a response related to the product of said two quantities.

29. The combination of elements as in claim 28 wherein each of said selectors includes a pair of diodes connected anode to anode.

30. A high-speed area-type analog device wherein the product of two quantities is obtained, said device comprising means for generating a relatively high frequency serrated or triangular wave voltage, means for generating a second voltage shifted in amplitude relative to the first by an amount proportional to a first relatively slowly varying quantity, means establishing a third voltage, means for generating a fourth voltage which intersects said first voltage at intervals and which is shifted relative to said third voltage by an amount proportional to a second relatively slowly varying quantity, and means for measuring the discrete areas bounded by said four voltages to obtain a product of said quantities.

References Cited in the file of this patent

UNITED STATES PATENTS

| | | |
|---|---|---|
| 2,674,409 | Lakatos | Apr. 6, 1954 |
| 2,831,107 | Raymond et al. | Apr. 15, 1958 |

OTHER REFERENCES

"A Simple Electronic Multiplier" (Norsworthy), Electronic Engineering (London), No. 26, pages 72–75, February 1954.